Nov. 14, 1939.    H. M. E. DU BOSCQ DE BEAUMONT    2,179,881
METHOD AND DEVICE FOR MAKING ARTICLES CONSISTING
OF A BAND OF THE HELICAL TYPE
Filed Feb. 3, 1936
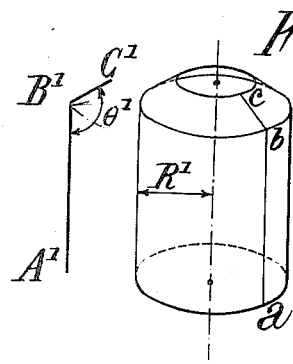
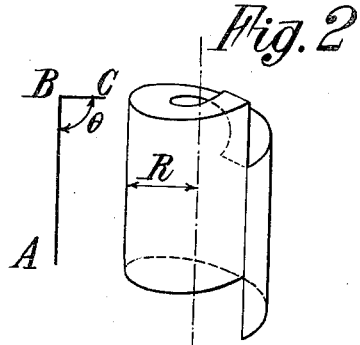
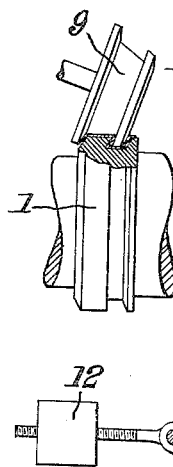
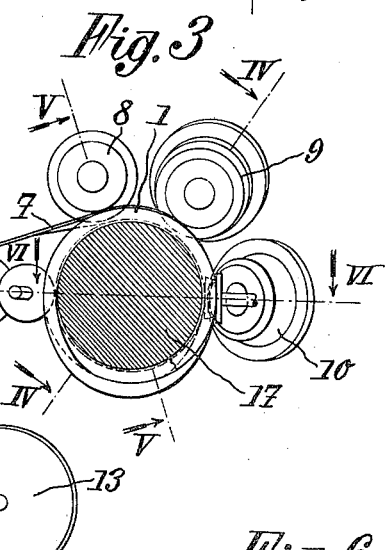
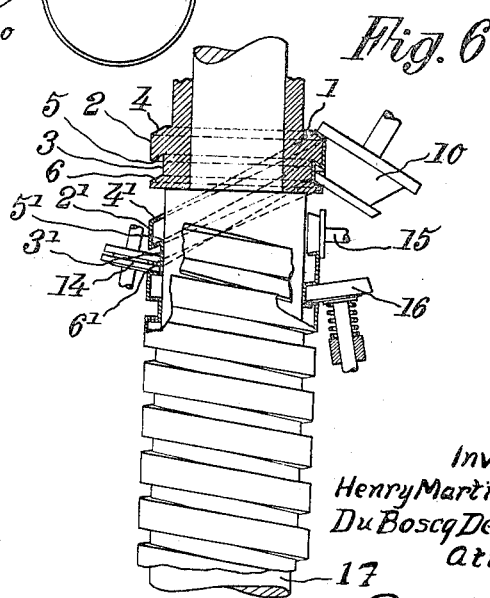
Inventor:
Henry Martial Emile
Du Boscq De Beaumont
Attorneys:
Bailey & Parsons Patented Nov. 14, 1939

2,179,881

UNITED STATES PATENT OFFICE 2,179,881

METHOD AND DEVICE FOR MAKING ARTICLES CONSISTING OF A BAND OF THE HELICAL TYPE

Henry Martial Emile Du Boscq de Beaumont, Saint-Victor l'Abbaye, France

Application February 3, 1936, Serial No. 62,216
In Belgium February 13, 1935

9 Claims. (Cl. 113—35)

The present invention concerns methods and devices for making articles consisting of a band of the helical type or an analogous type. In the following description, by "band of the helical type" I mean the matter present between two helicoid surfaces which are generally, although not necessarily, close to each other. Furthermore, by "band of a type analogous to the helical type" I mean a band which, when seen from a direction parallel to the axis about which the surface is wound, instead of having a circular outline has a polygonal, elliptic, or any other outline. The invention is more especially, although not exclusively, concerned with methods and apparatus for the manufacture of flexible pipes of metal or any other hard material.

The object of the present invention is to provide a method and apparatus which is better adapted to meet the requirements of practice than methods and apparatus used up to this time for obtaining articles of the type above referred to.

According to an essential feature of the method involved in the present invention, I apply the principle that which any helicoid can be fitted upon a surface of revolution and conversely. In applying this principle, by a first operation, I bring a flat band of substantially rectilinear cross section, for instance, to fit by deformation on a surface of revolution, and by a second operation I give said band the shape of a helicoid in accordance with the principle above stated.

According to another feature, the apparatus according to the present invention includes, on the one hand, a moulding surface of revolution capable of giving to a continuous band a predetermined sectional shape, and, on the other hand, guiding means arranged in such manner as to produce the winding of the band, as it leaves said moulding surface, in the form of a helicoid the axial section of which corresponds to said sectional shape.

Other features of the present invention will be understood from the following detailed description of some specific embodiments.

Preferred embodiments of the present invention will be hereinafter described, with reference to the accompanying drawing, given merely by way of example, and in which:

Figs. 1 and 2 are diagrammatical views intended to illustrate the principle of the method according to the present invention;

Fig. 3 is an elevational view of an apparatus for the manufacture of a flexible metal pipe according to the invention;

Fig. 4 is a sectional view on the line IV—IV of Fig. 3;

Fig. 5 is a sectional view on the line V—V of Fig. 3;

Fig. 6 is a sectional view on the line VI—VI of Fig. 3.

In order to simplify explanations, the invention will be more specifically described with reference to the manufacture of flexible metal pipes consisting of a band wound in helical manner.

Up to the present time, said bands were obtained by winding in a helical manner a developable band around a mandrel, generally of cylindrical shape. Initially, the helical band thus formed was not geometrically applicable on said mandrel and it was therefore necessary, in order to obtain coincidence between said mandrel and the developable band, to subject said band to deformations the result of which was, on the one hand, to modify the surface area of the portions of which said band was made, thus creating tensions in its internal structure, and, on the other hand, to frequently necessitate the disengagement of the mandrel and its return to initial position when the pipe to be formed was longer than the mandrel so that the manufacture was discontinuous.

According to the present invention, in order to obviate these drawbacks, and, especially, in order to permit of obtaining a continuous manufacture, I apply the theorem, called Bour's theorem, (see "Differential Geometry", by Luther Eisenhart, page 147, Ginn and Company, 1909) according to which any helicoid can be applied upon a surface of revolution and inversely. As expressed in the above publication, this theorem is that every helicoid is applicable to some surface of revolution and helices on the former correspond to the parallels on the latter. I therefore proceed in the following manner for manufacturing a helical band:

In a first operation, I cause a band, for instance a flat band, to fit, by deformation, against a moulding surface of revolution.

In a second operation, I move the band thus treated away from the moulding surface, in such manner as to constitute a continuous helical band, the tensional of equivalent stresses to be applied for this purpose implying, theoretically, no final elongation of the limiting surface previously applied upon the mould.

The theorem above referred to permits of establishing an exact reciprocal relation between the profile (or axial section) of the helicoid and the meridian line or axial section of the corresponding surface of revolution. For instance the surface of a square-shaped threaded screw can be applied upon a catenoid of revolution about its basis. In a likewise manner, an element of an equilateral triangular thread screw can be applied upon a hyperboloid. It is therefore possible, for any shape of a helicoid surface, to determine by calculation the meridian line of the corresponding surface of revolution.

In order to illustrate the principle of the invention, it will be supposed that it is desired to manufacture an element of a helical pipe as shown by Fig. 2, the profile (or axial section) of said element corresponding to line A B C which forms an angle $\theta$, side B C being supposed to be relatively small.

According to the principle of the present invention, I first establish a surface of revolution, diagrammatically shown by Fig. 1, the meridian line $A^1 B^1 C^1$ of which corresponds, in accordance with Bour's theorem, with section A B C, sides $A^1 B^1$ and $B^1 C^1$ making with each other an angle $\theta'$ different from $\theta$.

The pipe element is then obtained by bringing the surface of revolution, which is supposed to have been cut along line $a\ b\ c$, into helical shape. This does not involve any variation of the areas of the portions of surface, so that no stress is developed inside the mass of matter, the only modification being the variation of the angle above referred to. Furthermore, the radius R of the pipe element is smaller than the radius $R^1$ of the surface of revolution to which it corresponds.

Now, supposing that it is desired to manufacture not an element of a helical pipe but a flexible helical pipe of any length whatever, for instance from a plane band, I make use, according to the present invention, of the following apparatus:

First, essentially, means for shaping the band, which is supposed to be originally flat, so as to give it, in section, the shape of the meridian line of a moulding surface of revolution the shape of which is determined in accordance with Bour's theorem;

Secondly, preferably, means for applying a suitable tension to the band when said first mentioned means are brought into play;

Thirdly, means for moving the band thus treated away from the moulding surface in a general direction parallel to the axis of said surface of revolution, in a continuous manner, so as to constitute the flexible helical pipe.

The last mentioned means may eventually be combined with the first mentioned means so as to constitute a single unit.

The first mentioned means consist essentially of a moulding surface of revolution which is given a rotary movement about its axis through any suitable means and which can serve to drive the band to be deformed. Advantageously, this moulding surface consists of a milling tool 1 or wheel 1, for the manufacture of a pipe of average diameter (1 or 2 centimeters for instance), or even a drum or a roller if the size of the band calls for it. The axial section of said wheel shall be deduced from the axial section of the helicoid that it is desired to obtain, in accordance with Bour's theorem.

However, it should be noted that account is to be taken, for determining the axial section of the tool, of the elasticity of the matter to be treated, which generally tends to come back to its initial shape. Thus the axial section of the wheel, in order to correspond to a particular case, is not exactly the line indicated by Bour's theorem, but it can be either calculated, when the coefficient of elasticity of the matter that is employed is known, or determined experimentally, in such manner that, after the matter has come back into its final position, the axial section corresponds to the line resulting from Bour's theorem with any sufficient approximation.

The axial section of the pipe that is more especially considered by way of example essentially includes a portion $2^1$, of rectilinear section, parallel to the axis of the pipe, and a groove consisting of a portion $3^1$ of rectilinear section also parallel to said axis, into which groove the portion $4^1$ of the next spire can engage. In other words, the strip in cross section has two main portions preferably in different planes, a connecting portion connecting the first two portions, and oppositely directed flanges at the free edges of the first two portions.

Shaping wheel 1 is then given an axial section producing two cylindrical portions 2 and 3, a connecting section 4, and flanges 5 and 6, each of the last three corresponding to a frustum of a cone.

I further provide at least one counter-wheel arranged in such manner as to compel band 7 to be applied simultaneously against the meridian curve of the surface of revolution and a portion of the circular periphery thereof. This counter-wheel shall permit, by keeping band 7 applied between its meridian curve and that of wheel 1, of ensuring the drive of said band by adhesion.

Advantageously, I provide several counter-wheels of this kind, for instance three designated by reference numbers 8, 9, 10, distributed over a portion of the periphery of wheel 1, so as to increase the surface of adhesion.

It is further advisable, especially when the meridian curve, or axial section, of wheel 1 has reentrant portions, to devise the sections and the axes of the counter-wheels 8, 9, 10 in such manner that the deformation of the band takes place gradually. The last counter-wheel 10 is then so shaped, and its axis so positioned, that the interval between wheel 1 and counter-wheel 10, when both of said wheels are rotating, represents as exactly as possible (account being taken of the possibilities of operation) the section that must be given to the band so as to render it applicable on the helicoid that is to be established.

Of course, in some cases, prior to undergoing this succession of deformations by passing through the system including wheels and counter-wheels 1, 8, 9 and 10, the band shall have to be subjected to suitable thermal treatments such as successive heatings, temperings, etc. and this through any suitable devices.

It should also be noted that at least some of the wheels and counter-wheels above mentioned may be either positively driven or left free to rotate about their axes.

The second mentioned means which, as above mentioned, are preferably provided for suitably tensioning the band are then made as follows:

I provide at least one wheel 11 adapted to transform into a tension $T_0$ the action of gravity on counterweight 12, adjustable on the rod that carries it. Of course, this tension $T_0$ might be obtained through any other suitable means, such for instance as braking devices or the like.

Furthermore, preferably, I provide a device for amplifying this tension $T_0$.

I may for instance provide a system of wheels about a portion of the periphery of each of which the band is wound, which increases by friction the resistance of band 7 to the driving effort imparted by wheel 1. I provide such a number of these wheels 13 that the band is fed to the shaping wheels and counter-wheels with the optimum tension, which, as a matter of fact, depends upon the material of which said band is made.

This tensioning device may be operatively connected to the driving means through gears of any suitable type. The connections between the driving means and the tensioning means shall be established in such manner as to obtain the desired tensioning of the band when it reaches the shaping wheels and counter-wheels.

It results from the action of the tensioning system and that of the counter-wheels that the band is compelled to adapt itself to the surface of the mould over a predetermined arc which is sufficiently large (while being smaller than one complete turn) instead of being applied against the shaping wheel 1 only in the vicinity of the meridian curve thereof as was the case with some prior methods in which the band left the pair of shaping wheels between which it was held in the direction of a tangent to the cylinder.

Concerning now the third means above referred to, intended to axially move the band away from the field of revolution of the shaping wheel, after said band has been treated by said wheel, said means may include any suitable devices such as stops, rollers, wheels, arranged in such manner that they produce a general elongation of the band in the direction of the axis of revolution of the moulding surface, thus moving said band away from said moulding surface. For practical purposes, it will be necessary, in most cases, to effect a displacement which exceeds the geometrically determined position corresponding to the helicoid to be obtained, in order that said band may come back to said position by elasticity. According to the drawing, this elongation is produced by the engagement of flange 6 with a groove in a wheel 14, as shown at $6^1$ in Fig. 6.

Furthermore, I take advantage of this temporary supplementary axial elongation and of the elastic deformations to cause successive spires to overlap one another and eventually to insert one or several jointing wires, whereby the successive spires shall mesh with one another, driving along said jointing element together with them.

The devices above described will be arranged in such manner as also to permit of modifying certain angles which, in the course of the change from the surface of revolution to the helical surface, are to undergo certain variations, as above explained with reference to angles $\theta$ and $\theta'$. However, it should be noted that these modifications do not involve any variation of the area of the surface elements formed by treatment of the band by the moulding surface.

Obviously, if the desired axial section of the article includes sharp bends or acute angles which would require too delicate moulds or too difficult operations because of the reduced space in which the operations would have to take place, I might after the helical band has been obtained, subject it to certain complementary deformations.

According to the embodiment that is more especially considered, I provide three shaping wheels 14, 15 and 16, the axes of which are obliquely positioned, intended to pinch the angles made by the formerly conical portions of the band with the formerly cylindrical portions thereof. Shaping wheel 14 serves to rectify the portion of surface of the helicoid that corresponds to part 6 of shaping wheel 1, while the surface elements corresponding to parts 4 and 5 of the wheel are rectified by passing between shaping wheels 15 and 16.

Shaping wheels 15 and 16 may be either positively driven or mounted loose on their respective axes. In the example that is being described, this last mentioned solution is that which was adopted.

The formation of the pipe, after its deformation by the moulding surface, then takes place in the following manner:

The rectified surface $6^1$ shall engage, as shown in Fig. 6 opposite wheel 16, owing to the elasticity of the band, under band $4^1$ of the preceding turn or spire, which is already rectified.

Shaping wheels 15 and 16 shall then rectify surface elements $4^1$ and $5^1$ and the spire of the pipe shall be finished.

Advantageously, in order to be able to employ shaping wheels of various shapes, I make use of an adjusting device which permits of varying the inclination of said wheels.

This winding operation shall be effected on a mandrel which may be eventually connected with the moulding surface, in coaxial or non-coaxial relation therewith.

In the embodiment that is being described by way of example, I make use of a mandrel 17 which is short and integral with the moulding wheel 1.

As said mandrel does not occupy the whole volume inside the pipe, it does not exert an expanding action on the parts that are being wound thereon and does not brake the feed of the article that is being formed thereon.

In order to produce the interlocking of the successive turns of the band and their displacement in the axial direction, I might make use of any other suitable means.

A machine for the production of flexible metal tubes or pipes is obtained by fitting all the devices which have been above described suitably together.

The operation of such a machine results clearly from the preceding explanations.

The method and apparatus according to the present invention have many advantages, among which are the following:

They permit of obtaining flexible tubes or pipes of metal or a matter of analogous hardness and plasticity of any length whatever, in a continuous manner and without producing internal tensions in the matter.

They permit of making use of bands of metal or a hard material, of a certain thickness, with the creation, in this case, of internal tensional stresses of a value as low as possible.

They permit, by merely changing the system of shaping wheels, of obtaining, with a given machine, pipes of different sizes.

They are easy and simple to carry out.

Of course, the specific embodiment above described has been given merely by way of example and, for instance, instead of having a stationary frame and a rotary shaping wheel, the shaping wheel might be stationary and the frame would be caused to rotate about it.

In order to obtain any helical article other than a pipe, I might employ a band of cylindrical, prismatic or any other shape, or also a wire.

Of course, the shaping or moulding surface, instead of being of circular cross section might have a section in the shape of a closed curve, such as an ellipse or the like, a polygon, etc., the other elements of the machine being suitably modified to correspond therewith.

Briefly, the apparatus as shown in Fig. 6 operates in the following manner: The strip is formed to a definite cross section, and is simultaneously curved about the mandrel 1 on a radius approximately equal to that of the tube to be formed. The roller 14 by its position relative to the mandrel 1 draws the curved strip axially of the mandrel to produce a helix having a greater angle than that of the finished tube. The rolls 15 and 16 then cooperate with roll 14 to produce an interlock of the flanges and at the same time to reduce the angle of the helix to the desired one.

However, it should be understood that while this is a preferred form of the invention, the scope thereof is not so limited.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. The method of making helical tubing which comprises curving a strip about an axis transverse to the length of the strip and providing flanges on said strip parallel to the length of the strip, after such curving distorting such strip in a direction parallel to such axis so as to reduce the diameter thereof, and then reducing the angle of distortion, whereby to interlock said flanges with flanges of adjacent turns to form a helical tube.

2. The method of making helical tubing which comprises curving a strip about an axis transverse to the length of the strip and simultaneously forming flanges on said strip parallel to the length of the strip, after such curving distorting such strip in a direction parallel to such axis so as to reduce the diameter thereof, and then reducing the angle of distortion, whereby to interlock said flanges with flanges of adjacent turns to form a helical tube.

3. A machine for making helical tubing which comprises means for curving a strip about an axis transverse to the length of the strip, means for forming flanges on said strip parallel to the length of the strip, means operative after such curving means for distorting such curved strip in a direction parallel to such axis so as to reduce the diameter thereof, and means for then reducing the angle of distortion, whereby to interlock said flanges with flanges of adjacent turns to form a helical tube.

4. A machine for making helical tubing which comprises means for curving a strip about an axis transverse to the length of the strip and for simultaneously forming flanges on said strip parallel to the length of the strip, means operative after such curving means for distorting such curved strip in a direction parallel to such axis so as to reduce the diameter thereof, and means for then reducing the angle of distortion, whereby to interlock said flanges with flanges of adjacent turns to form a helical tube.

5. A method as claimed in claim 1, in which said flanges are such that the strip has a cross section having two main portions located in general in different planes, a connecting portion connecting said main portions, and flanges at the free edges of said main portions, said flanges being directed respectively inwards and outwards.

6. The method of making helical tubing from a strip of material which comprises forming interlocking flanges on the strip, curving the strip about the axis of the helix to be formed while maintaining the longitudinal axis of the strip in a plane perpendicular to said first axis and then deforming the so curved part of the strip in the direction of said first axis so as to give it helicoidal shape and to cause said flanges to interlock.

7. The method of making helical tubing from a strip of material which comprises curving the strip about the axis of the helix to be formed while maintaining the longitudinal axis of the strip in a plane perpendicular to said first axis and simultaneously with such curving forming on the strip interlocking flanges, and then deforming the so curved part of the strip in the direction of said first axis so as to give it helicoidal shape and to cause said flanges to interlock.

8. Method of making helical tubing which comprises feeding a band of metal to a shaping element rotatable about the axis of the helix to be formed and having a surface provided with cylindrical shaping zones at different distances from its axis of rotation, pressing said band against the surface thereof to cause it to conform substantially to such surface, whereby to impart to the band a cross section having along its edges oppositely directed flanges, curving such band, while maintaining its longitudinal axis in a plane perpendicular to said axis of rotation, around said shaping element, and then moving the thus curved portion of said band in the direction of the axis of rotation of the latter so as to form helical tubing and to cause interlocking of said flanges.

9. Apparatus for producing flexible helical tubing from a band of metal, comprising in combination a shaping element rotatable about the axis of the tube to be formed and having a surface provided with shaping zones at different distances from the axis of rotation, each of such shaping zones lying between lines forming closed curves on said surface and each line lying in a plane perpendicular to said axis, means to press said band against said element so as to form interlocking flanges thereon and to curve it around said element in a direction perpendicular to the axis of rotation of said element while maintaining the longitudinal axis of the band in a plane perpendicular to said axis of rotation, and means for guiding the band, after being curved in said perpendicular plane, in the direction of said axis of rotation so as to give it helicoidal shape and cause interlocking of said flanges.

HENRY MARTIAL EMILE DU BOSCQ
DE BEAUMONT.